United States Patent
Arimitsu

(10) Patent No.: US 6,957,079 B2
(45) Date of Patent: Oct. 18, 2005

(54) BASE STATION TRANSMISSION POWER CONTROL METHOD AND APPARATUS

(75) Inventor: Kazuhiro Arimitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 09/986,439

(22) Filed: Nov. 8, 2001

(65) Prior Publication Data

US 2002/0058524 A1 May 16, 2002

(30) Foreign Application Priority Data

Nov. 14, 2000 (JP) .............................. 2000-346337

(51) Int. Cl.$^7$ ............................................. H04Q 7/20

(52) U.S. Cl. ................ 455/522; 455/67.11; 455/127.2; 455/115.1; 455/69

(58) Field of Search ...................... 455/522, 69, 67.11, 455/67.13, 115.1, 115.2, 115.3, 115.7, 127.2; 714/704

(56) References Cited

U.S. PATENT DOCUMENTS

| 5,621,737 A | 4/1997 | Bucher |
| 2003/0207695 A1 * | 11/2003 | Chang et al. ................ 455/522 |

FOREIGN PATENT DOCUMENTS

| JP | 001128578 A1 * | 5/2000 | ............ H04B 7/26 |
| WO | WO 00/19636 A1 | 4/2000 | |
| WO | WO 00/27050 | 5/2003 | |

* cited by examiner

Primary Examiner—Nick Corsaro
Assistant Examiner—Philip J Sobutka
(74) Attorney, Agent, or Firm—Sughrue Mion, PLLC

(57) ABSTRACT

In a base station transmission power control method, the first expected value of the first block error rate representing predetermined reception quality is set in a potable terminal apparatus. The second block error rate in the potable terminal apparatus is measured with the second count smaller than the first count which is an execution count of error detection processing required to measure the first block error rate. The potable terminal apparatus controls the transmission power of a base station on the basis of the measured second block error rate. A base station transmission power control apparatus is also disclosed.

2 Claims, 2 Drawing Sheets

BASE STATION TRANSMISSION POWER CONTROL METHOD AND APPARATUS

BACKGROUND OF THE INVENTION

The present invention relates to a base station transmission power control method and apparatus which control the transmission power of a base station from a potable terminal apparatus.

A potable terminal apparatus based on the W-CDMA (Wideband-Code Division Multiple Access) scheme has a transmission power control function of controlling transmission power from a base station. According to this function, reception quality as a reference is set in a potable terminal apparatus in advance, and the transmission power of a base station is so controlled as to satisfy the quality requirement. A block error rate (to be referred to as a BLER hereinafter) is a parameter used for reception quality.

A conventional base station transmission power control algorithm will be described with reference to FIG. 4. According to the conventional method, an expected value x of a BLER is set in advance as reception quality required for each service in a potable terminal apparatus (step S1).

When a communication channel is opened, the potable terminal apparatus performs a CRC (Cyclic Redundancy Check) computation on the basis of reception data. This CRC computation result is counted m (m is an integer equal to or more than 1) times (step S2). In this case, if $x=10^{-4}$ is set, the CRC computation result must be counted at least m=1000 times. Upon counting the CRC computation result m times, the potable terminal apparatus calculates a BLER.

The potable terminal apparatus then compares the calculated BLER with the expected value x (step S3). If the BLER is larger than the expected value x (the reception state is worse than the state represented by the expected value), the potable terminal apparatus sends, to the base station, a transmission power control (to be referred to as TPC) bit for increasing the transmission power of the base station by a designated transmission power increase amount (step width) $\lambda$ (step S5). If the BLER is equal to or smaller than the expected value x (the reception state is better than the state represented by the expected value), the potable terminal apparatus sends, to the base station, a TPC bit for decreasing the transmission power of the base station by a designated transmission power decrease amount (step width) $\gamma$ (step S7). With this operation, transmission power control on the base station can be performed. The designated transmission power decrease amount ($\lambda$, $\gamma$) is written in the specifications "25,214 Physical layer procedure (FDD) Section 5" defined by the standardization initiative called the 3GPP (Third Generation Partnership Project).

A BLER is a parameter calculated at intervals of several msec to several ten msec (e.g., 10 msec, 20 msec, or 40 msec). In general, a value of about $10^{-4}$ is used as an expected value of a BLER set as reception quality. According to the conventional transmission power control method, therefore, to satisfy $BLER=10^{-4}$, measurement must be continued for at least 100×N sec (10 msec×N÷$10^{-4}$). It takes much time to measure a BLER. Note that N (integer) represents a TrCH (transport channel) size.

A measurement time of 100×N sec for a BLER is considerably long as compared with the minimum value of the intervals of execution of transmission power control. For this reason, a considerably long period of time is required for transmission power control (improvement in reception quality). To execute accurate transmission power control at high speed, it is required to shorten the measurement time for a BLER.

SUMMARY OF THE INVENTION

It is an object of the present invention to provide a base station transmission power control method and apparatus which can shorten the measurement time for a BLER and realize high-speed transmission power control.

In order to achieve the above object, according to the present invention, there is provided a base station transmission power control method comprising the steps of setting a first expected value of a first block error rate representing predetermined reception quality in a potable terminal apparatus, measuring a second block error rate in the potable terminal apparatus with a second count smaller than a first count which is an execution count of error detection processing required to measure the first block error rate, and causing the potable terminal apparatus to control transmission power of a base station on the basis of the measured second block error rate.

DESCRIPTION OF THE PREFERRED EMBODIMENTS

The present invention will be described in detail below with reference to the accompanying drawings.

Figure 1:
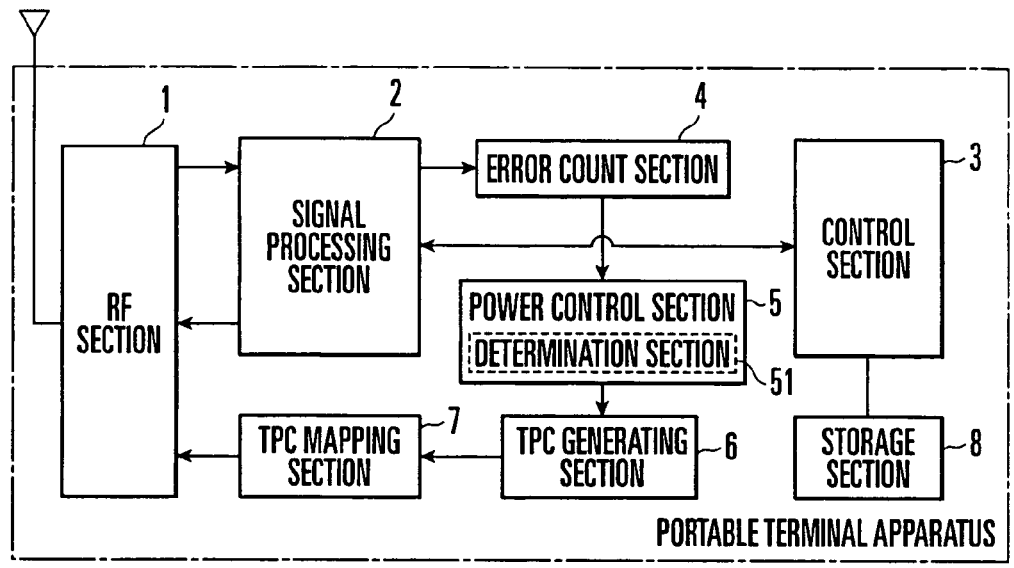
FIG. 1 is a block diagram showing a portable terminal apparatus according to an embodiment of the present invention.

FIG. 1 shows a portable terminal apparatus according to an embodiment of the present invention. The portable terminal apparatus shown in FIG. 1 is comprised of a radio frequency (RF) section 1 for down-converting a received signal having a radio frequency and A/D-converting the signal to output digital data, a signal processing section 2 for decoding the data output from the RF section 1 by de-spreading it, a control section 3 for controlling the operation of the portable terminal apparatus in accordance with the decoded data output from the signal processing section 2, an error count section 4 for calculating a BLER by counting the number of CRC code errors from the decoding result obtained by the signal processing section 2, a power control section 5 for determining the necessity/nonnecessity to increase/decrease the transmission power of a base station (not shown) on the basis of the BLER result output from the error count section 4, a TPC generating section 6 for generating a TPC bit on the basis of the determination result obtained by the power control section 5, a TPC mapping section 7 for mapping the TPC bit output from the TPC generating section 6 in an upstream communication channel to the base station, and a storage section 8 storing a plurality of expected values in correspondence with counts in advance.

The error count section 4, power control section 5, and TPC generating section 6 constitute a base station transmission power control apparatus.

Figure 2:
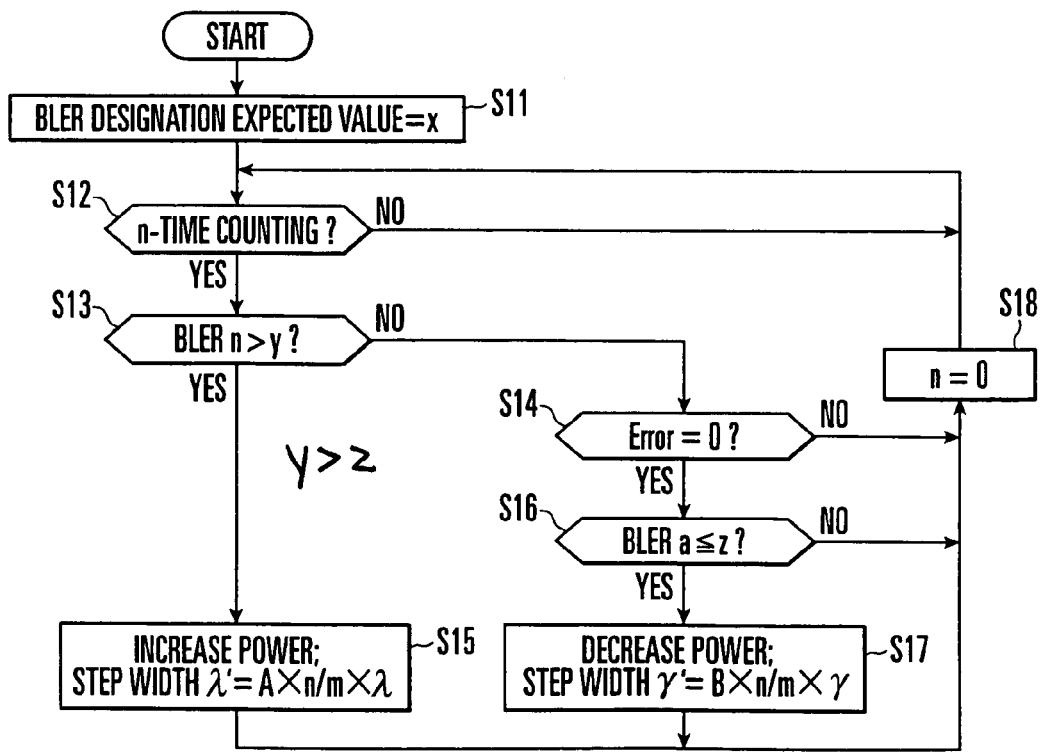
FIG. 2 is a flow chart showing base station transmission power control operation by the portable terminal apparatus in FIG. 1.

An algorithm for base station transmission power control performed by the portable terminal apparatus having the above arrangement will be described next with reference to the flow chart of FIG. 2. In this embodiment, an expected value x of a BLER similar to the one in the prior art is set in the portable terminal apparatus in advance (in step S11).

The error count section 4 performs a CRC computation on the basis of decoded reception data from the signal processing section 2. This CRC computation result is counted n (n is an integer equal to 1 or more) times (step S12). In this case, a count n can be variable. For example, as described above, to satisfy BLER=$10^{-4}$, the above CRC computation result must be counted at least m=1000 times. However, the count can be changed (decreased) by setting, for example, n=100 or n=200 under the condition that n<m.

In addition, with respect to a BLER corresponding to the count n (to be referred to as a BLERn hereinafter), an expected value y of the BLERn corresponding to the count n is set in the portable terminal apparatus in advance. The error count section 4 counts the CRC computation result n times first, and then calculates the BLERn. If, for example, the error count obtained as a result of counting n times is "2", the BLERn becomes "2/n".

A determination section 51 of the power control section 5 compares the BLERn output from the error count section 4 with the expected value y (step S13). If the determination result obtained by the power control section 5 indicates that the BLERn is larger than the expected value y (the reception state is worse than the state represented by the expected value y), the TPC generating section 6 generates a TPC bit for instructing to increase the base station transmission power (step S15). At this time, a designated transmission power increase amount (step) width $\lambda'$ indicated by the TPC bit can be arbitrarily set like $\lambda'$=A×n/m$\lambda$ in accordance with the count n and a constant A that can be arbitrarily set. However, this step width $\lambda'$ is set to a value smaller than $\lambda$.

The signal processing section 2 generates data for a communication channel used for transmission to the base station. The TPC mapping section 7 multiplexes the TPC bit from the TPC generating section 6 with the data generated by the signal processing section 2. The RF section 1 spreads the multiplexed data including the TPC bit into a signal having a radio frequency and transmits it to the base station. The base station receives the data from the portable terminal apparatus and increases the transmission power in accordance with the direction (increase/decrease) and step width indicated by the TPC bit.

If it is determined in step S13 that the BLERn is equal to or smaller than the expected value y (the reception state is better than the state represented by the expected value), the determination section 51 of the power control section 5 checks whether there is an error in the result obtained by the error count section 4 upon counting n times (step S14). If an error exists, the value n is reset to 0 in step S18, and the flow returns to step S12. With this operation, determination is made on the next BLERn calculated by the error count section 4 (steps S12 and S13).

If it is determined in step S14 that no error exists, the determination section 51 of the power control section 5 compares the BLER obtained from the total count obtained until now (to be referred to as a BLERa hereinafter) with a predetermined expected value z (step S16). If, for example, n-time counting is repeated twice, and the number of errors obtained as a result of 2n-time counting is "2", the BLERa becomes "2/(2n)". Note that the total count and the total error count are reset to 0 in step S18 after the transmission power is increased in step S15 or the transmission power is decreased in step S17.

If it is determined in step S16 that the BLERa exceeds the expected value z (the reception state is worse than the state represented by the expected value), the value n is reset to 0 in step S18, and the flow returns to step S12. With this operation, determination is made on the next BLERn calculated by the error count section 4 (steps S12 and S13). If the BLERa is equal to or smaller than the expected value z (the reception state is better than the state represented by the expected value), the TPC generating section 6 generates a TPC bit for instructing to decrease the transmission power of the base station (step S17). A designated transmission power decrease amount (step width) $\gamma'$ indicated by the TPC bit can be arbitrarily set like $\gamma'$=B×n/m$\gamma$ in accordance with the count n and a constant B that can be arbitrarily set. However, the step width $\gamma'$ is set to a value smaller than $\gamma$.

The above expected value y is set to a value larger than the expected value x (BLER is high). This does not indicate that the expected value y is allowed to be smaller than the expected value x, but indicates that the precision of the expected value x cannot be sufficiently increased because the count is set to be small. In addition, if the expected value z is equal to the expected value x or the precision of the expected value z cannot be increased to the precision level of the expected value x, the expected value z is set to a value larger than the expected value x (BLER is high). Therefore, the above expected values x, y, and z are set to satisfy expected value y>expected value z≧expected value x The TPC mapping section 7 multiplexes the TPC bit from the TPC generating section 6 with the data generated by the signal processing section 2. The multiplexed data from the TPC mapping section 7 is converted into a signal having a radio frequency by the RF section 1 and transmitted to the base station. The base station receives the data from the portable terminal apparatus and decreases the transmission power in accordance with the direction and step width indicated by the TPC bit.

According to this embodiment, the count in calculating a BLER is decreased as compared with the count in the prior art (from m to n), and the step width of transmission power control is changed more finely than the preset value in the prior art. Therefore, the transmission power of a base station can be controlled quickly and accurately. This makes it possible to quickly and accurately obtain a BLER (reception quality) required for each service.

Even if the number of errors in n-time counting operation is "0", it does not necessarily means that the reception quality requirement is satisfied. In this embodiment, therefore, if "NO" is obtained in step S13 and "YES" is obtained in step S14, the transmission power of the base station is not quickly decreased but is decreased only when a certain condition is satisfied. More specifically, if the BLERa obtained from the total count obtained until now is equal to or smaller than the expected value z ("YES" in step S16), the transmission power of the base station is decreased. In contrast to this, if "YES" is obtained in step S13, the transmission power of the base station is immediately increased to improve the reception quality.

Figure 3:
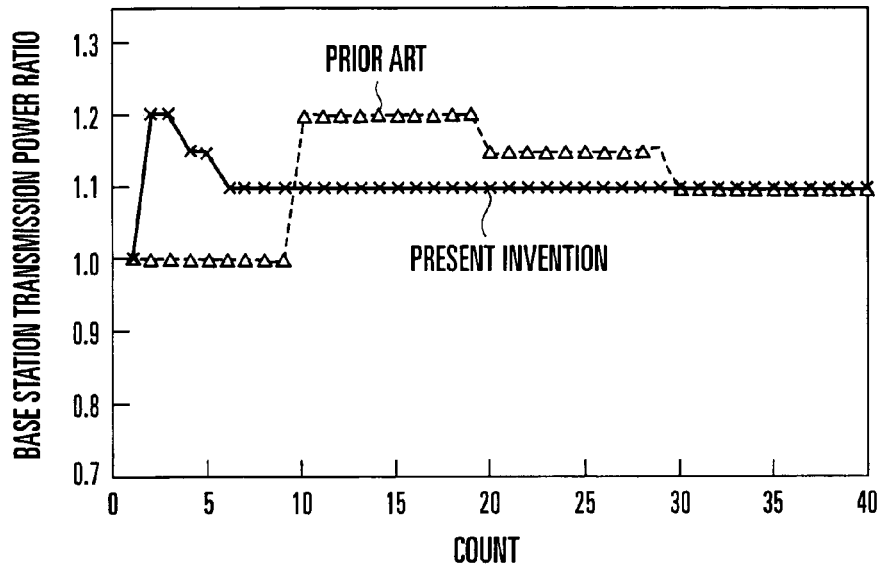
FIG. 3 is a graph showing the characteristics obtained by using the base station transmission power control algorithms according to the prior art and the present invention.
Figure 4:
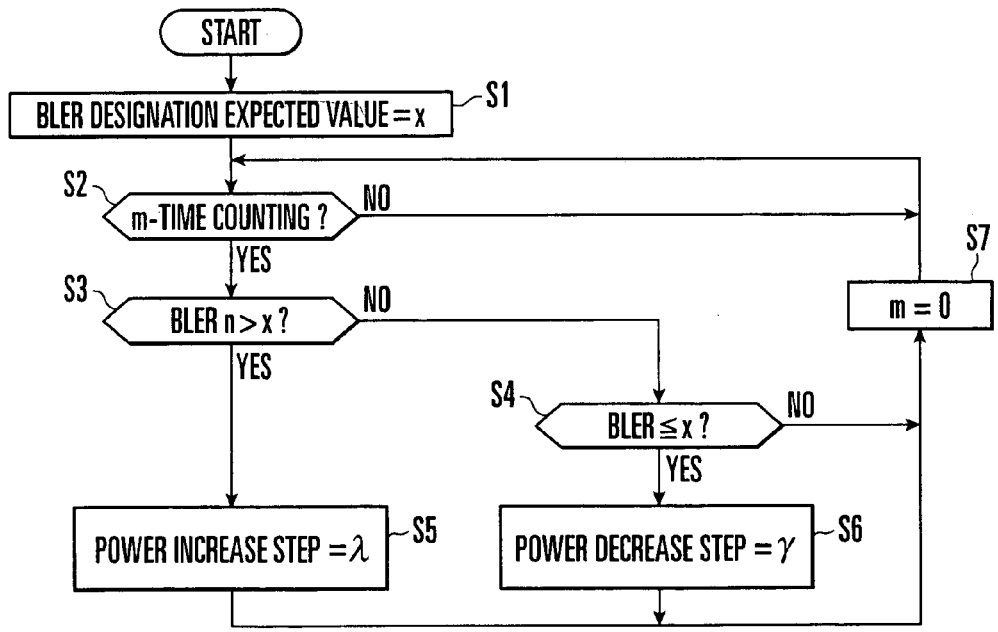
FIG. 4 is a flow chart showing base station transmission power control operation by a conventional portable terminal apparatus.

FIG. 3 shows the characteristics obtained by using base station transmission power control algorithms according to the prior art and the present invention. In this case, a convergence target value is set to a base station transmission power ratio of 1.1 with a transmission power increase width of 0.2 and a transmission power decrease width of 0.05. As is obvious from FIG. 3, according to the base station transmission power control algorithm, an expected result is obtained with ⅓ the number of times of measurement in the conventional method. That is, the method of the present invention is more effective than the conventional method.

According to the present invention, the second block error rate is measured with the second count smaller than the first count required to measure the first block error ate, and the transmission power of the base station is controlled on the basis of the second block error rate. Therefore, the measurement time for a block error rate can be shortened. This makes it possible to realize high-speed transmission power control performed by the portable terminal apparatus for the base station and improve the reception quality in the portable terminal apparatus at high speed.

The precision of transmission power control can be improved by setting the designated transmission power increase/decrease amount (step width) required for transmission power control on the base station based on the second block error rate to be smaller than that required for transmission power control based on the first block error rate.

What is claimed is:

1. A base station transmission power control method, comprising:
    a) setting a first expected BLER (block error rate) in a portable terminal;
    b) setting a second expected BLER in the portable terminal, where the second expected BLER is less than the first expected BLER;
    c) opening a communication channel between the base station and the portable terminal;
    d) measuring the BLER of transmissions from the base station to the portable terminal by performing a cyclic redundancy check a specified number of times;
    e) comparing the measured BLER to the first expected BLER;
    f) if the measured BLER is greater than the first expected BLER, transmitting a transmission power control signal from the portable terminal to the base station, instructing the base station to increase power by a first amount,
    g) if the measured BLER is less than or equal to the first expected BLER, determining if the measured BLER is zero;
    h) if the measured BLER is not zero, returning to step (c);
    i) if the measured BLER is zero, calculate the total BLER measured since the opening of the communication channel between the base station and the portable terminal;
    j) if the total BLER is greater than the second expected BLER, returning to step (c);
    k) if the total BLER is less than or equal to the second expected BLER, transmitting a transmission power control signal form the portable terminal to the base station, instructing the base station to decrease power by a second amount.

2. A portable terminal, comprising:
a storage in which a first expected BLER (block error rate) and a second expected BLER, less than the first expected BLER, are stored;
an error count section which measures the BLER of transmissions from a base station by performing a cyclic redundancy check a specified number of times;
a determination section which compares the measured BLER to the first expected BLER;
a transmission power control generator which generates a transmission power control signal, instructing the base station to increase power by a first amount if the BLER measured by the error count section is greater than the first expected BLER;
wherein if the measured BLER is less than or equal to the first expected BLER, the error count section determines if the measured BLER is zero and if the measured BLER is not zero, the error count section resets the cyclic redundancy check to zero and performs a new cyclic redundancy check;
a control section which calculates a total BLER measured by the error count section if the measured BLER is zero;
wherein if the total BLER is less than or equal to the second expected BLER, the transmission power control generator generates a transmission power control signal instructing the base station to decrease power by a second amount.

* * * * *